(12) United States Patent
Miyoshi et al.

(10) Patent No.: US 6,298,248 B1
(45) Date of Patent: Oct. 2, 2001

(54) BASE STATION APPARATUS AND FRAME SYNCHRONIZATION ACQUISITION METHOD

(75) Inventors: Kenichi Miyoshi, Yokohama; Katsuhiko Hiramatsu, Yokosuka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/514,194

(22) Filed: Feb. 28, 2000

(30) Foreign Application Priority Data

Mar. 4, 1999 (JP) .................................. 11-056811

(51) Int. Cl.$^7$ ...................................... H04B 1/38
(52) U.S. Cl. .................. 455/561; 455/67.1; 455/502
(58) Field of Search .................. 455/67.1, 67.3, 455/67.6, 502, 503, 561, 562, 501; 370/315, 350, 503, 508, 510, 516, 519; 375/356, 362, 371

(56) References Cited

U.S. PATENT DOCUMENTS

| | | | |
|---|---|---|---|
| 4,231,114 | * 10/1980 | Dolikian | 455/502 |
| 5,613,211 | * 3/1997 | Matsuno | 370/350 |
| 5,722,080 | * 2/1998 | Kondo | 455/502 |
| 5,761,198 | * 6/1998 | Kojima | 375/356 |
| 5,774,810 | * 6/1998 | Sugi | 455/502 |
| 5,875,402 | * 2/1999 | Yamawaki | 455/502 |
| 6,081,571 | * 6/2000 | Jansson | 455/502 |
| 6,097,709 | * 8/2000 | Kuwabara | 370/350 |
| 6,112,088 | * 8/2000 | Haartsen | 455/502 |
| 6,119,016 | * 6/1998 | Matusevich | 455/67.6 |

FOREIGN PATENT DOCUMENTS 5308333  11/1993  (JP).

\* cited by examiner

*Primary Examiner*—Nay Maung
*Assistant Examiner*—Quochien B. Vuong
(74) *Attorney, Agent, or Firm*—Stevens, Davis, Miller & Mosher, LLP (57) ABSTRACT

Before ordinary communications are started, a base station apparatus of the present invention connects antenna 101 for use in acquiring frame synchronization to selector 105 by the control of antenna selection section 113, expands a communication area in the horizontal direction, directly receives a transmission signal from a base station apparatus as a reference of synchronization, and acquires the frame synchronization. After the frame synchronization is acquired, the apparatus communicates with a mobile station apparatus existing in the communication area using antennas 102 and 103. Thus, even in the case where the base station apparatus as the reference of synchronization does not exist in an ordinary communication area, the apparatus can detect the frame timing assuredly, thereby preventing the occurrence of interference between base station apparatuses.

9 Claims, 9 Drawing Sheets

BASE STATION APPARATUS AND FRAME SYNCHRONIZATION ACQUISITION METHOD

BACKGROUND OF THE INVENTION

1. Field of the Invention

The present invention relates to a base station apparatus and frame synchronization acquisition method in a radio communication system in which frame synchronization is acquired between base station apparatuses.

2. Description of the Related Art

In radio communication systems, in order to cancel interference between base station apparatuses to increase the system capacity, as disclosed in Japanese Unexamined Patent Publication HEI5-308333, a method is sometimes adopted in which the frame synchronization is acquired between a plurality of base station apparatuses, and the timing of a transmission slot and that of a reception slot are made the same between the base station apparatuses.

Figure 1:
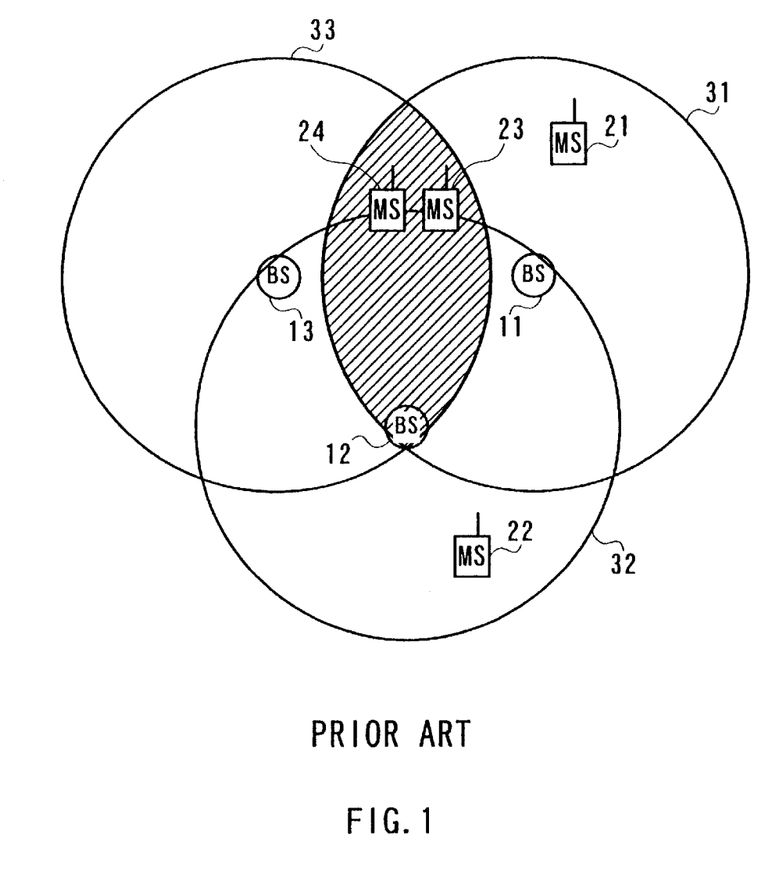
FIG. 1 is a diagram illustrating a radio communication system including conventional base station apparatuses.

FIG. 1 is a diagram illustrating a radio communication system including conventional base station apparatuses. It is assumed that base station apparatus 12 synchronizes the frame timing thereof with the frame timing of base station apparatus 11 which is currently a reference of the frame synchronization. It is further assumed that base station apparatus 11 performs communications with mobile station apparatuses 21 and 23 existing in communication area 31 of base station apparatus 11, base station apparatus 12 performs communications with mobile station apparatus 22 existing in communication area 32 of base station apparatus 12, and that base station apparatus 13 starts communicating.

Base station apparatus 13 acquires the frame timing of base station apparatus 11 which is the reference of the frame synchronization before starting ordinary communications. In this case, since base station apparatus 11 exists out of communication area 33 of base station apparatus 13, base station apparatus 13 cannot receives a signal from base station apparatus 11 directly.

Therefore, base station apparatus 13 synchronizes the frame timing thereof with that of base station apparatus 12 to be indirectly in frame synchronization with base station apparatus 11. Base station apparatus 13 starts communicating with mobile station apparatus 24 existing in communication area 33 thereof after acquiring the frame synchronization.

Thus, in the case where the conventional base station apparatus detects the frame timing of a neighboring base station apparatus to synchronize, the conventional base station apparatus detects the frame timing of the neighboring base station apparatus existing closest thereto, and performs communications in synchronization with the frame timing of such a neighboring base station apparatus.

Figure 2:
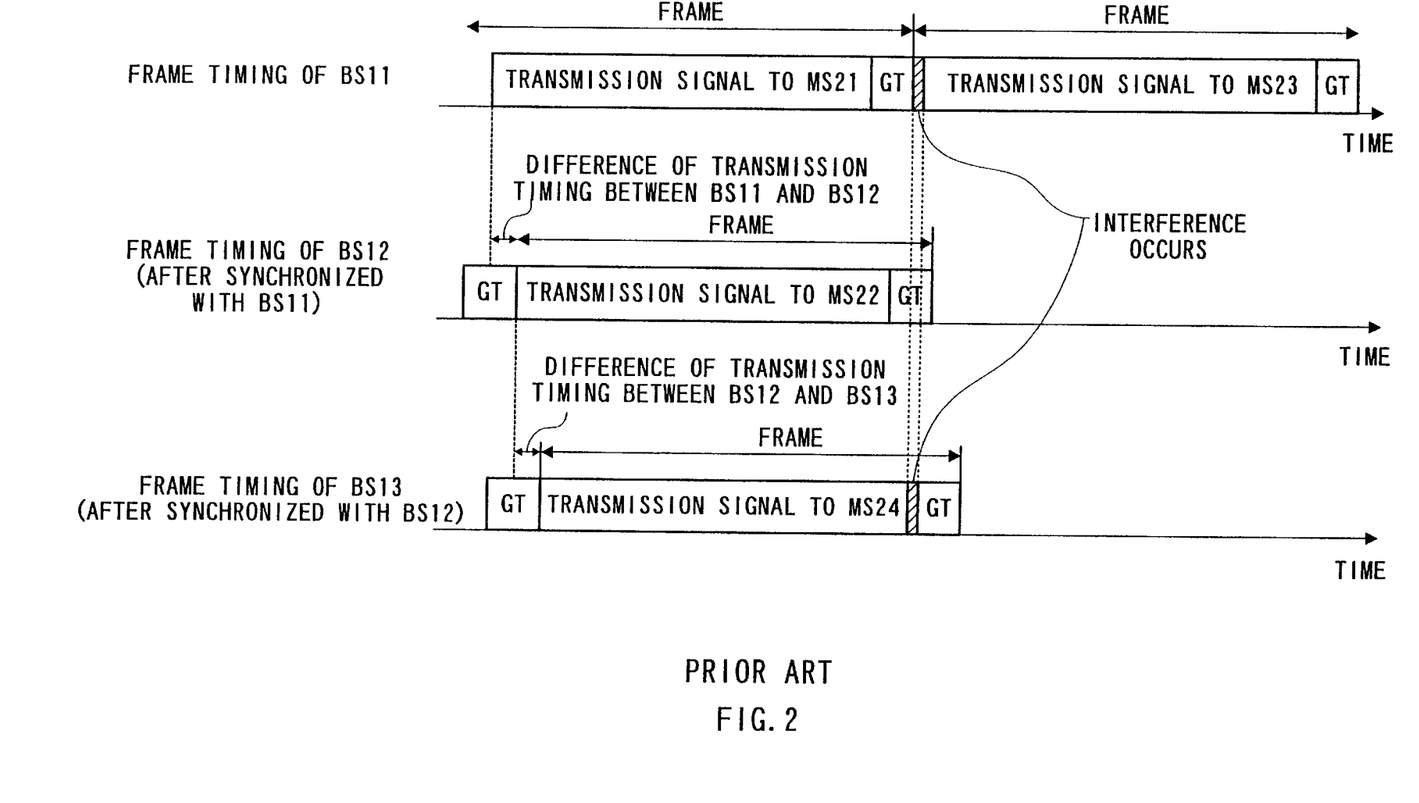
FIG. 2 is an explanatory diagram according to the conventional frame synchronization system.

FIG. 2 is a diagram illustrating the frame timing of each base station apparatus after the frame synchronization acquisition is completed.

As illustrated in FIG. 2, due to errors caused by that each base station apparatus receives a transmission signal from another base station apparatus to detect the timing, the transmission timings of frames to mobile station apparatuses from respective base station apparatuses are not completely synchronous, resulting in errors almost equivalent to a guard time.

Since the error of the transmission timing between base station apparatuses 11 and 12 is within a range of the guard time, and both base station apparatuses do not transmit a message at the guard time portion, interference does not occur between both base stations. Similarly, the interference does not occur between base station apparatuses 12 and 13.

However, the error of the frame synchronization between the base station apparatuses are accumulated, and consequently some part of the transmission signal of base station apparatus 11 and that of base station apparatus 13 overlap in time each other, causing the case where the interference sometimes occurs between base station apparatuses 11 and 13.

Such interference occurs at a portion with oblique lines in FIG. 1 where the communication area of base station apparatus 11 and that of base station apparatus 13 overlap each other. Accordingly, as illustrated in FIG. 2, the interference occurs when base station apparatus 13 transmits a signal to mobile station apparatus 24 in some frame, and base station apparatus 11 transmits a signal to mobile station apparatus 11 in next frame.

Thus, in the conventional base station apparatuses, when a base station apparatus with the frame timing as a reference of the frame synchronization does not exist in the communication area of some apparatus, the apparatus does not acquire the frame synchronization directly, but acquires that indirectly, resulting in the problem that errors of frame timings between the base station apparatuses become large, and that the interference occurs.

SUMMARY OF THE INVENTION

An object of the present invention i s to provide a base station apparatus and frame synchronization method which do not cause interference between base station apparatuses in the case where a base station apparatus as a reference of frame synchronization does not exist in an ordinary communication area.

The base station apparatus of the present invention achieves the above object by controlling the directivity of an antenna to receive a transmission signal from the base station apparatus as the reference of frame synchronization directly with the antenna, detecting a transmission timing of the base station apparatus as the reference of synchronization, and controlling the transmission timing thereof in accordance with the detected transmission timing.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Embodiments of the present invention will be described below specifically with reference to accompanying drawings.

(First Embodiment)

Figure 3:
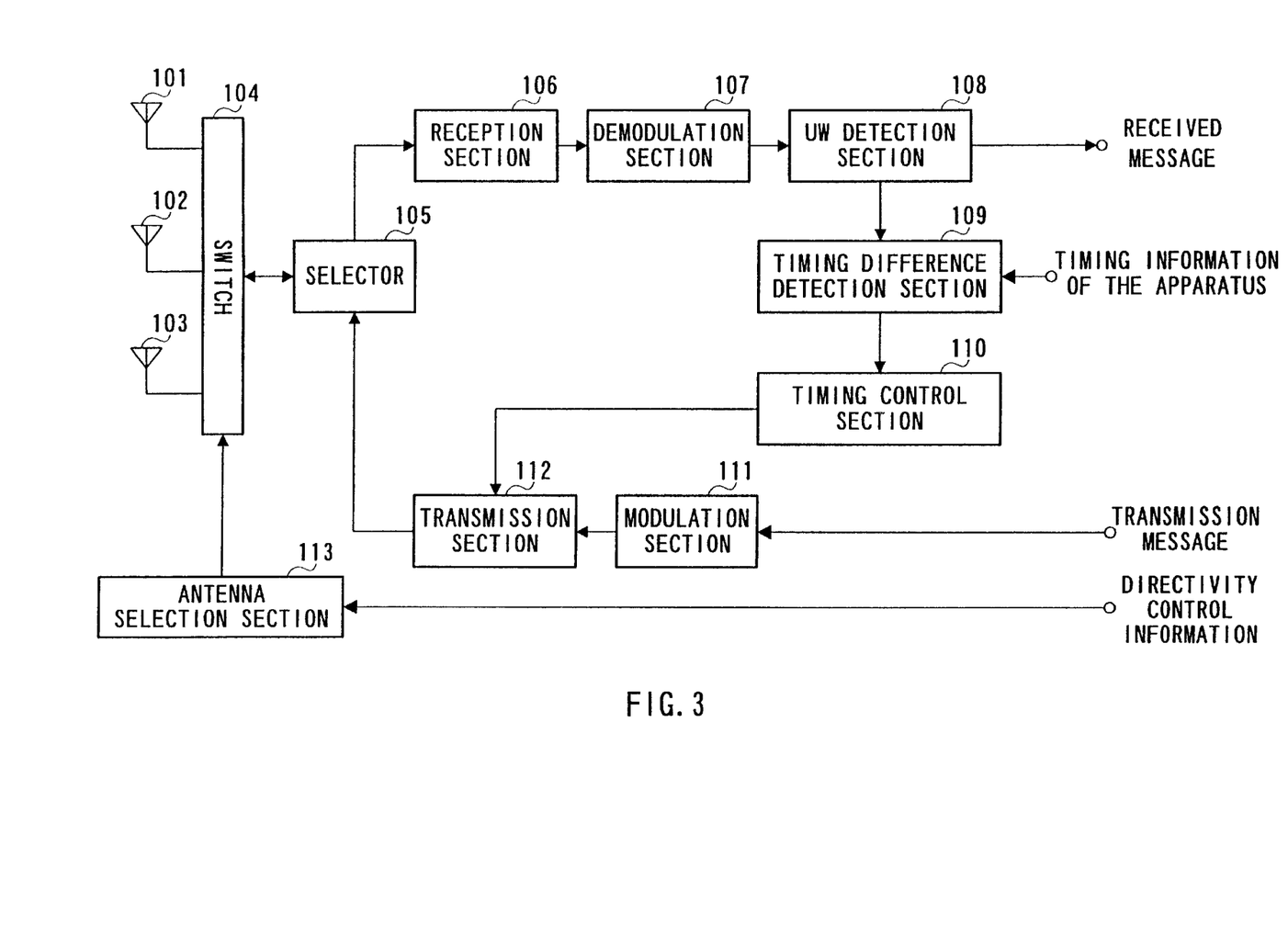
FIG. 3 is a block diagram illustrating a configuration of a base station apparatus according to a first embodiment of the present invention.

FIG. 3 is a diagram illustrating a configuration of a base station apparatus according to the first embodiment of the present invention.

Switch 104 outputs a signal received at one of antennas 101 to 103 to selector 105, while outputting a transmission signal outputted from selector 105 to one of antennas 101 to 103 to transmit.

Selector 105 outputs the signal passed through switch 104 to reception section 106, while outputting an output signal from transmission section 112 to switch 104.

Reception section 106 subjects the received signal passed through selector 105 to processing such as amplification and frequency conversion to output to demodulation section 107. Demodulation section 107 executes detection processing on the output signal from reception section 106 to output to UW detection section 108.

UW detection section 108 fetches a received message from the output signal from demodulation section 107, detects a unique word portion in the received signal, and outputs timing information of neighboring station indicative of the end time of the unique word to timing difference detection section 109.

Timing detection section 109 detects a difference between the timing of this apparatus and that of the neighboring station outputted from UW detection section 108, and outputs timing difference information that is the detected result to timing control section 110.

Timing control section 110 controls the transmission timing of transmission section 112 according to the timing difference information detected in timing difference detection section 109.

Modulation section 111 inserts the unique word to a transmission message, then executes modulation processing, and outputs the resultant signal to transmission section 112. Transmission section 112 subjects the output signal from modulation section 111 to processing such as amplification and frequency conversion, and outputs the resultant signal to switch 105 according to a timing based on a control signal outputted from timing control section 110.

Antenna selection section 113 controls switch 104, while selecting an antenna for use in transmission and reception from antennas 101 to 103, based on directivity control information.

Figure 4:
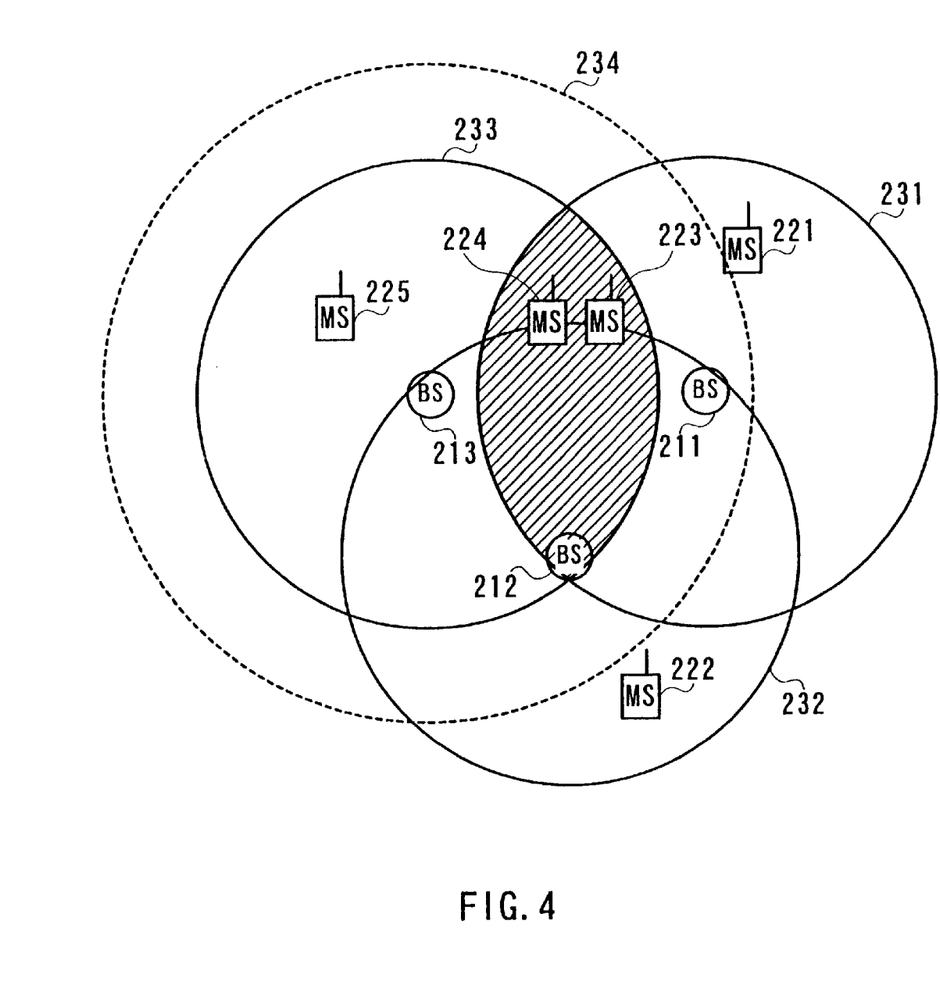
FIG. 4 is a diagram illustrating a radio communication system including the base station apparatus according to the first embodiment of the present invention.
Figure 5:
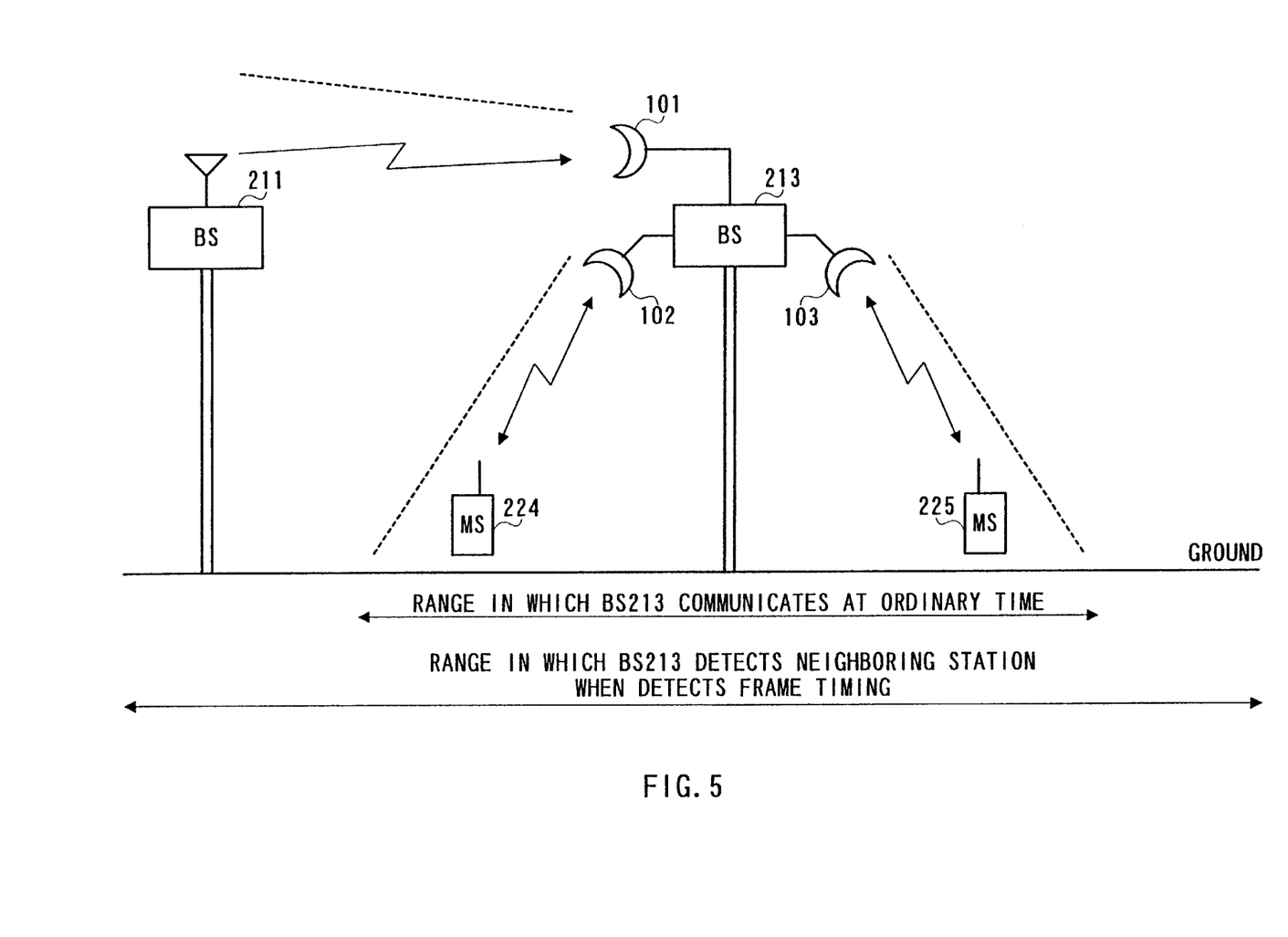
FIG. 5 is another diagram illustrating the radio communication system including the base station apparatus according to the first embodiment of the present invention.

FIGS. 4 and 5 are diagrams illustrating a radio communication system including a base station apparatus according to this embodiment. FIG. 4 is a top view, and FIG. 5 is an elevation view.

In FIG. 4, it is assumed that the frame timing of base station apparatus 212 is currently synchronous with that of base station apparatus as a reference of synchronization (hereinafter referred to as "synchronization master station") 211, synchronization master station 211 communicates with mobile station apparatuses 221 and 223 existing in communication area 231 of the master station 211, base station apparatus 212 communicates with mobile station apparatus 222 existing in communication area 232 of the apparatus 212, and that base station apparatus 213 illustrated in FIG. 3 starts communicating.

Base station apparatus 213 acquires frame synchronization before starting communicating. In this case, by selecting an antenna for the frame synchronization, the apparatus 213 expands the communication area in the horizontal direction. In FIG. 4, communication area 234 is for use by base station apparatus 213 to acquire the frame synchronization.

In FIG. 5, antenna 101 for use in acquiring the frame synchronization points to the direction of base station apparatus 211, and provides the communication area which is broader in the horizontal direction than those of other antennas pointing to mobile stations.

Base station apparatus 213 connects antenna 101 to switch 105 according to the control from antenna selection section 113, expands the communication area in the horizontal direction, and thus enables direct reception of the transmission signal from synchronization master station 211.

After the frame synchronization is acquired, base station apparatus 213 communicates with mobile station apparatuses 224 and 225 existing in the communication area using antennas 102 and 103. In addition, antenna 101 for use in acquiring the frame synchronization is not used in transmission.

Figure 6A:
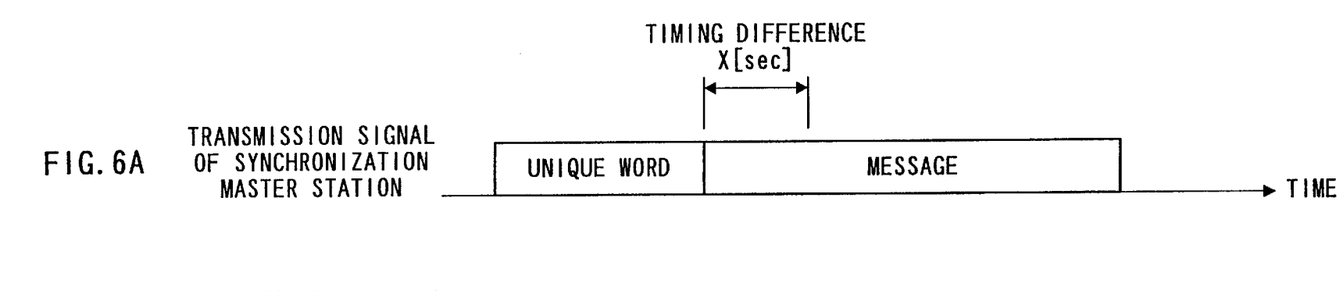
FIG. 6A is a transmission timing diagram of the base station apparatus according to the first embodiment of the present invention.
Figure 6B:
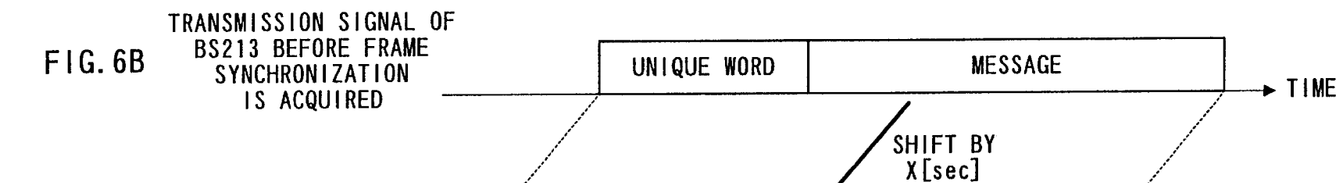
FIG. 6B is a transmission timing diagram of the base station apparatus according to the first embodiment of the present invention.
Figure 6C:
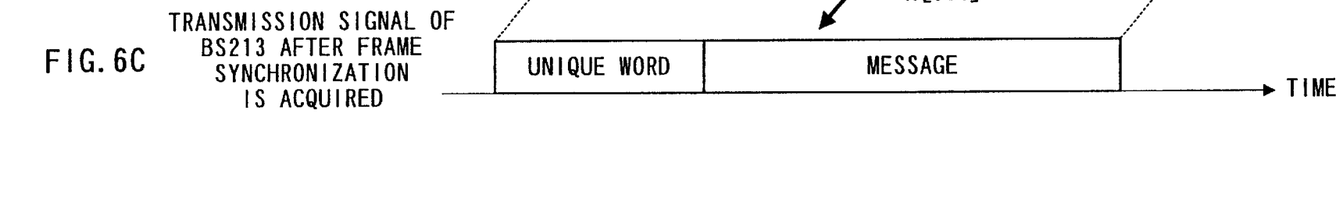
FIG. 6C is a transmission timing diagram of the base station apparatus according to the first embodiment of the present invention.

The correction operation of frame synchronization in the base station apparatus according to this embodiment is next explained specifically using FIG. 6A, FIG. 6B and FIG. 6C. FIG. 6A, FIG. 6B and FIG. 6C illustrate frame timing diagrams in the case where the frame synchronization is corrected. FIG. 6A illustrates a frame timing diagram of a transmission signal of the synchronization master station, and FIG. 6B illustrates a frame timing diagram of a transmission signal of base station apparatus 213 in the case where the apparatus transmits a signal based on only the timing information of the apparatus.

Currently, the end time of the unique word of base station apparatus 213 differs from that of the unique word of the master synchronization station by X[sec], and this time difference corresponds to an error of transmission timing. Timing difference detection section 109 detects the transmission timing difference X between the apparatus and the synchronization master station, and timing control section 110 controls the transmission timing in transmission section 112 to set that forward by X[sec]. FIG. 6C illustrates a frame timing diagram of the transmission signal of base station apparatus 213 after the transmission timing is controlled.

Thus, by expanding the communication area, since it is possible to directly receive the signal transmitted from the base station apparatus as the reference of synchronization, even in the case where such a base station apparatus does not exist in an ordinary communication area, it is possible to prevent the occurrence of interference between base station apparatuses.

In addition, although the communication area for use in acquiring the frame synchronization is expanded by switching an antenna with the switch in this embodiment, it may be possible to expand the communication area by changing the antenna directivity upward in the direction vertical to the ground, or increasing the height of an antenna. These operations make the switch for use in switching an antenna no need.

(Second Embodiment)

Second embodiment explains the case where a base station apparatus directly receives a signal transmitted from the synchronization master station using an adaptive array reception method to detect the frame timing.

Figure 7:
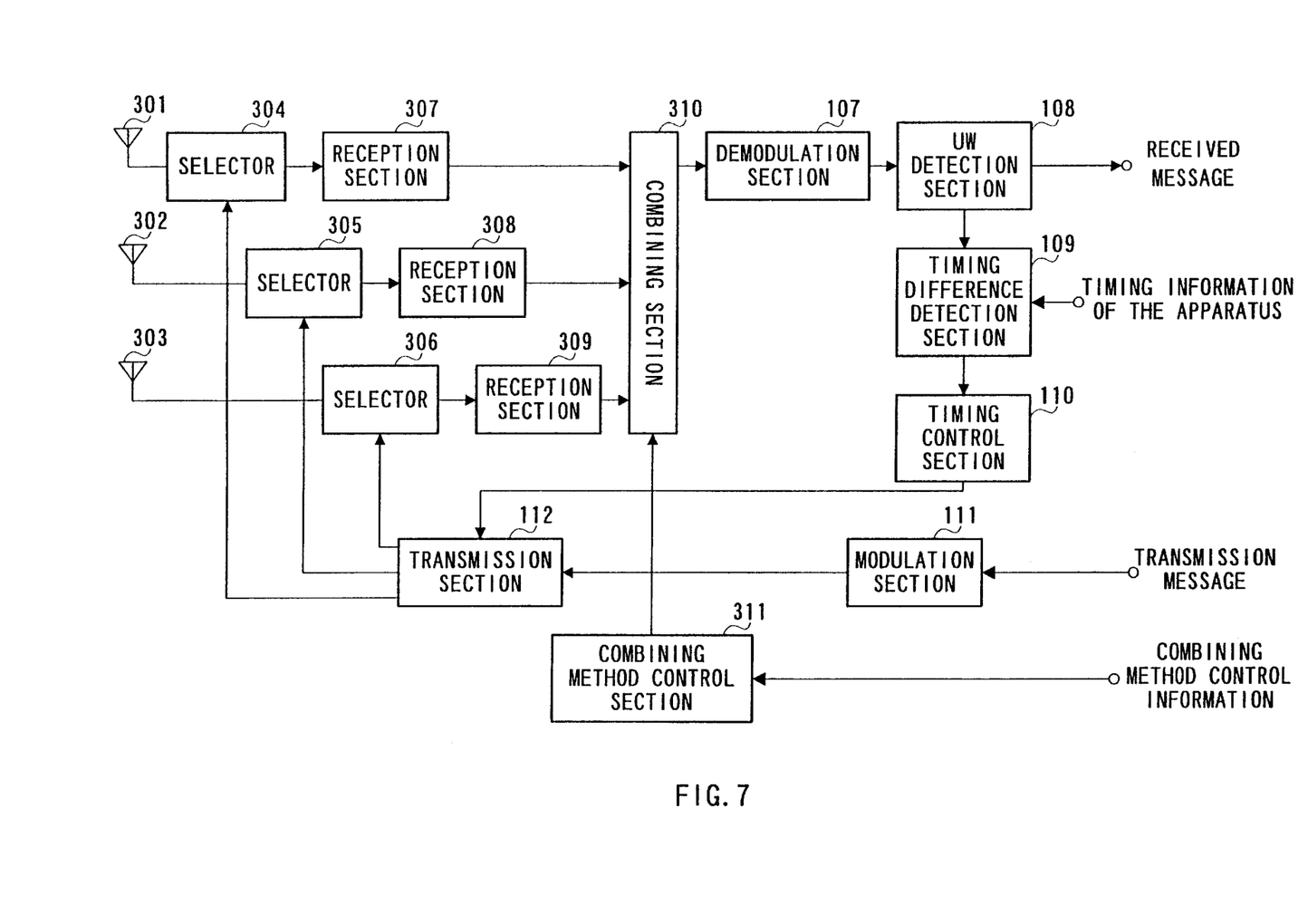
FIG. 7 is a block diagram illustrating a configuration of a base station apparatus according to a second embodiment of the present invention.

FIG. 7 is a block diagram for explaining a schematic configuration of the base station apparatus according to the second embodiment of the present invention. In addition, in the base station apparatus illustrated in FIG. 7, components common to those in the base station apparatus illustrated in FIG. 3 are given the same marks as in FIG. 3 to omit explanations thereof.

Selector 304 outputs a signal received at antenna 301 to reception section 307, while outputting an output signal from transmission section 112 to antenna 301. Selector 305 outputs a signal received at antenna 302 to reception section 308, while outputting an output signal from transmission section 112 to antenna 302. Selector 306 outputs a signal received at antenna 303 to reception section 309, while outputting an output signal from transmission section 112 to antenna 303.

Reception section 307 subjects the received signal passed through selector 304 to processing such as amplification and frequency conversion. Reception section 308 subjects the received signal passed through selector 305 to processing such as amplification and frequency conversion. Reception section 309 subjects the received signal passed through selector 306 to processing such as amplification and frequency conversion.

Combining section 310 combines the received signals outputted from reception sections 307 to 309 according to the combining method instructed by combining method control section 311, and outputs the resultant signal to demodulation section 107. Combining method control section 311 controls the combining method in combining section 310 based on combining method control information.

Figure 8:
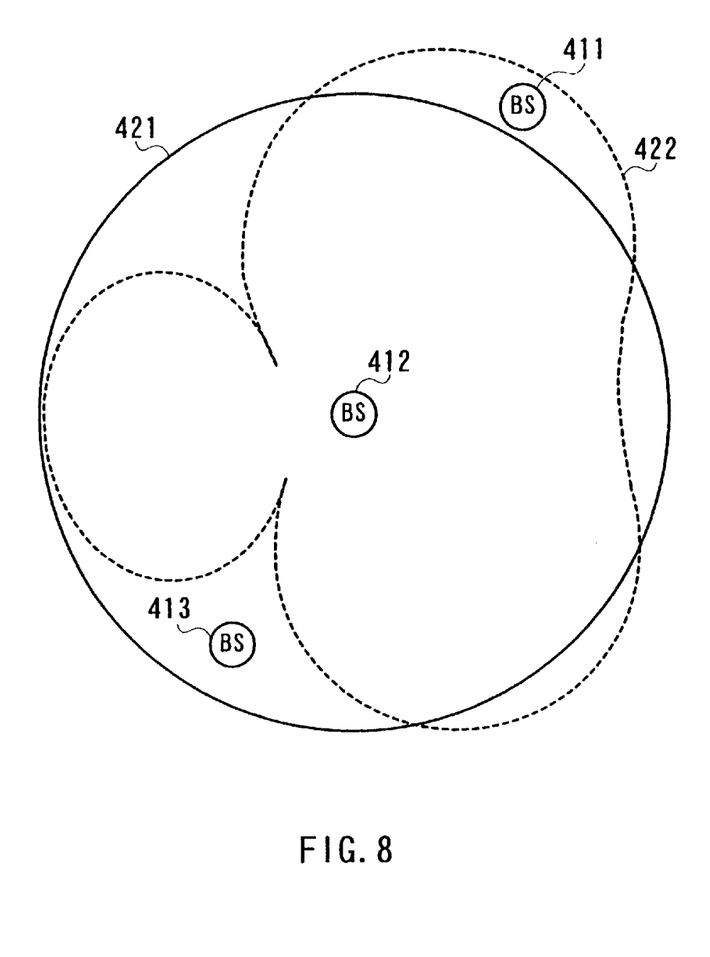
FIG. 8 is a diagram illustrating a radio communication system including the base station apparatus according to the second embodiment of the present invention.

FIG. 8 is a diagram illustrating a radio communication system including the base station apparatus according to this embodiment.

In FIG. 8, it is assumed that base station apparatus 412 illustrated in FIG. 7 synchronizes the frame timing with that of the synchronization master station 411. Base station apparatus 412 expands the communication area with the adaptive array reception method before starting communicating. In FIG. 8, base station apparatus 412 obtains communication area 421 by using an omnidirectional antenna, and further obtains communication area 422 by using the adaptive array reception method when acquires the frame synchronization.

As illustrated in FIG. 8, when the omnidiretional antenna is used, since synchronization master station 411 exists out of communication area 421 of the apparatus 412, base station apparatus 412 cannot receive a signal from base station apparatus 411. On the contrary, when the adaptive array reception method is used, since base station apparatus 412 can form the communication area in such a manner that base station apparatus 411 exists within the communication area 422 of the apparatus 412 by pointing the antenna directivity to the direction of base station apparatus 411, the apparatus 412 can directly receive the transmission signal from base station apparatus 411.

Further, since a null point is formed in the direction of interference station 413 which transmits a signal with the same channel as that of synchronization master station 411, base station apparatus 412 cancels the interference signal from interference station 413, and consequently can receive the transmission signal from base station apparatus 411 stably.

Thus, when the frame synchronization is acquired, executing reception with the adaptive array reception method enables the apparatus to receive a transmission signal from a desired station existing far from the apparatus, further to cancel the interference signal from the interference station, and therefore to assuredly synchronize the frame timing thereof with that of the base station apparatus as the reference of the frame synchronization.

In addition, although this embodiment describes about the case where three reception antennas are used, the present invention may achieve the same effects as in the above case in the case where four or more antennas are used.

Further, although the adaptive array processing is used as combining method to cancel interference in the case where the frame timing of the synchronization master station is detected in this embodiment, it may be effective to use other methods such as adaptive diversity reception method to cancel the interference.

(Third Embodiment)

Figure 9:
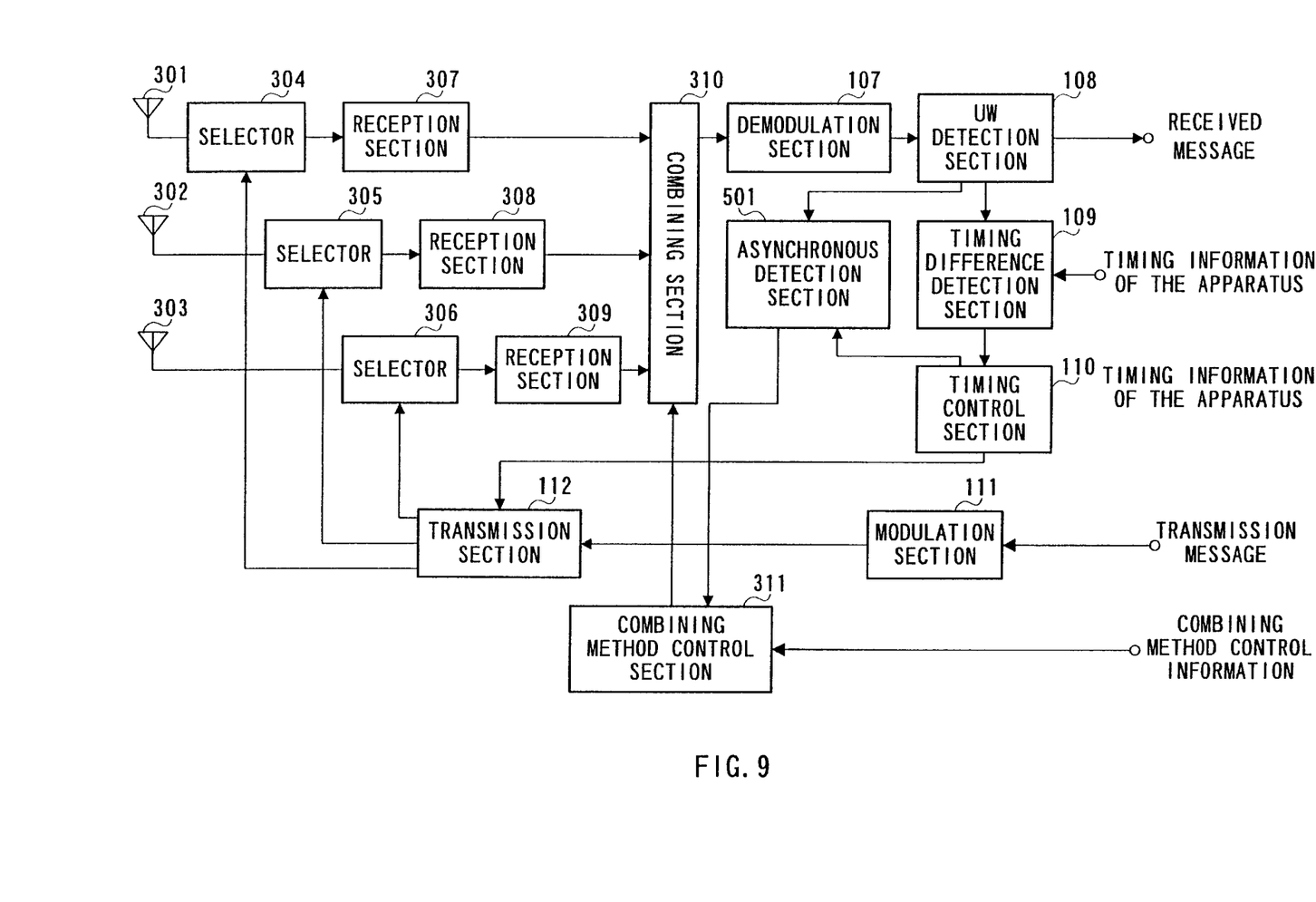
FIG. 9 is a block diagram illustrating a configuration of a base station apparatus according to a third embodiment of the present invention.

FIG. 9 is a block diagram for explaining a schematic configuration of a base station apparatus according to the third embodiment of the present invention. In addition, in the base station apparatus illustrated in FIG. 9, components common to those in the base station apparatus illustrated in FIG. 7 are given the same marks as in FIG. 7 to omit explanations thereof.

UW detection section 108 fetches a received message from an output signal from demodulation section 107, detects a unique word portion in a received signal, and outputs the timing information of neighboring station indicative of the end time of the unique word to timing difference detection section 109 and asynchronous detection section 501.

Timing control section 110 controls the transmission section according to timing difference information detected by timing difference detection section 109, and controls a transmission timing of a transmission signal, while outputting the timing information of this apparatus to asynchronous detection section 501.

Asynchronous detection section 501 monitors in ordinary communications whether the frame timing of the apparatus and that of the synchronization master station are synchronous based on the timing information of the apparatus inputted from timing control section 110 and the timing information of the synchronization master station inputted from UW detection section 108. When the frame timing of the apparatus and that of the synchronization master station are asynchronous, asynchronous detection section 501 changes the combining method of combining method control section 311 to the adaptive array reception method to expand the communication area, and using the expanded communication area, executes the frame synchronization processing.

Thus, the base station apparatus according to this embodiment monitors in ordinary communications whether or not the frame timing of the apparatus and that of the synchronization master station are synchronous, and when the frame timing of the apparatus and that of the synchronization master station are not synchronous, receives the signal transmitted from the synchronization master station by expanding the communication area, and synchronizes the frame timing thereof with that of the synchronization master station. According to the above processing, even in the case where the apparatus acquires the frame synchronization before starting ordinary communications, thereafter the transmission timing of the apparatus differs from that of the synchronization master station, and then the transmission timings become asynchronous, the apparatus can acquire the frame synchronization again. Further, also in the case where a new base station apparatus, of which the frame timing is not synchronized with that of the apparatus according to this embodiment, is installed around the apparatus after the apparatus is installed, the apparatus can acquire the frame synchronization from the new base station apparatus.

As described above, according to the base station apparatus and frame synchronization acquisition method of the present invention, since it is possible to directly receive a transmission signal from the base station apparatus as the reference of the frame synchronization by expanding the antenna directivity of the apparatus, the frame timing can be detected assuredly.

The present invention is not limited to the above described embodiments, and various variations and modifications may be possible without departing from the scope of the present invention.

This application is based on the Japanese Patent Application No. HEI11-056811 filed on Mar. 4, 1999, entire content of which is expressly incorporated by reference herein.

What is claimed is:

1. A base station apparatus, said base station apparatus acquiring synchronization and comprising:

directivity control means for controlling a directivity of an antenna to receive directly with said antenna a transmission signal from another base station apparatus as a reference of synchronization;

timing detection means for detecting a transmission timing of the another base station apparatus as the reference of synchronization; and transmission timing control means for controlling the transmission timing of said base station apparatus acquiring synchronization in accordance with the transmission timing detected in the timing detection means.

2. The base station apparatus according to claim 1, wherein said directivity control means controls the directivity of an adaptive array antenna in order not to receive a transmission signal from an interference station.

3. The base station apparatus according to claim 1, further comprising:

asynchronous detection means for detecting a difference of the transmission timing between the base station apparatus acquiring synchronization and the another base station apparatus as the reference of synchronization, wherein the transmission timing control means corrects the transmission timing in the case where the asynchronous detection means detects the difference.

4. A communication terminal apparatus which performs a radio communication with a base station apparatus acquiring synchronization, said base station apparatus comprising directivity control means for controlling a directivity of an antenna to receive directly with said antenna a transmission signal from another base station apparatus as a reference of synchronization; timing detection means for detecting a transmission timing of the base station apparatus as the reference of synchronization; and transmission timing control means for controlling the transmission timing of said apparatus acquiring synchronization in accordance with the transmission timing detected in the timing detection means.

5. A frame synchronization acquisition method comprising:

controlling a directivity of an antenna to receive a transmission signal from another base station apparatus as a reference of synchronization directly with said antenna;

detecting a transmission timing of the base station apparatus as the reference of synchronization; and controlling the transmission timing of a base station apparatus in accordance with a detected transmission timing.

6. The frame synchronization acquisition method according to claim 5, further comprising:

controlling the directivity of an adaptive array antenna in order not to receive a transmission signal from an interference station.

7. The frame synchronization acquisition method according to claim 5, further comprising:

detecting a difference of the transmission timing between the base station apparatus and the base station apparatus as the reference of synchronization; and correcting the transmission timing in the case where the difference is detected.

8. A base station apparatus, said base station apparatus acquiring synchronization and comprising:

an antenna having a directivity for receiving a transmission signal from another base station apparatus as a reference of synchronization, said another base station being located outside a standard communication area of said base station apparatus acquiring synchronization for communicating with other stations;

timing detection means for detecting a transmission timing of the base station apparatus as the reference of synchronization based on the signal received at said antenna; and transmission timing control means for controlling the transmission timing of said base station apparatus acquiring synchronization in accordance with the transmission timing detected in the timing detection means.

9. A base station apparatus acquiring synchronization, said base station apparatus comprising:

directivity control means for aiming a directivity of an antenna to another base station apparatus as a reference of synchronization;

demodulation means for demodulating a transmission signal from said base station apparatus as the reference of synchronization received at said antenna;

timing detection means for detecting a transmission timing of said base station apparatus as the reference of synchronization based on an output signal from said demodulation means; and transmission timing control means for controlling the transmission timing of said base station apparatus acquiring synchronization in accordance with the transmission timing detected in the timing detection means.

* * * * *